(12) United States Patent
Yoshioka et al.

(10) Patent No.: US 12,010,064 B2
(45) Date of Patent: Jun. 11, 2024

(54) USER TERMINAL AND RADIO COMMUNICATION METHOD

(71) Applicant: NTT DOCOMO, INC., Tokyo (JP)

(72) Inventors: Shohei Yoshioka, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/755,086

(22) PCT Filed: Oct. 9, 2018

(86) PCT No.: PCT/JP2018/037597
§ 371 (c)(1),
(2) Date: Apr. 9, 2020

(87) PCT Pub. No.: WO2019/073968
PCT Pub. Date: Apr. 18, 2019

(65) Prior Publication Data
US 2020/0244499 A1 Jul. 30, 2020

(30) Foreign Application Priority Data
Oct. 11, 2017 (JP) .................... 2017-208618

(51) Int. Cl.
*H04L 5/00* (2006.01)
*H04L 1/1829* (2023.01)
(Continued)

(52) U.S. Cl.
CPC .......... *H04L 5/0055* (2013.01); *H04L 1/1861* (2013.01); *H04L 5/001* (2013.01);
(Continued)

(58) Field of Classification Search
CPC ... H04L 27/2613; H04L 1/1861; H04L 5/001; H04L 5/0055; H04L 27/2602;
(Continued)

(56) References Cited

U.S. PATENT DOCUMENTS

| 2011/0269490 A1* | 11/2011 | Earnshaw | H04L 5/0053 455/509 |
| 2014/0018086 A1* | 1/2014 | Guo | H04L 5/0048 455/450 |

(Continued)

FOREIGN PATENT DOCUMENTS

| CN | 102959890 A | 3/2013 |
| CN | 104125040 A | 10/2014 |

(Continued)

OTHER PUBLICATIONS

International Search Report issued in PCT/JP2018/037597 mailed on Dec. 11, 2018 (2 pages).

(Continued)

*Primary Examiner* — Mang Hang Yeung
(74) *Attorney, Agent, or Firm* — Osha Bergman Watanabe & Burton LLP

(57) ABSTRACT

A user terminal according to one aspect of the present disclosure has a transmission section that transmits uplink control information by using an uplink shared channel, and a control section that selects resource elements, which are provided at given frequency intervals, and which are for mapping the uplink control information, in a symbol adjacent to a symbol for a demodulation reference signal for the uplink shared channel.

4 Claims, 13 Drawing Sheets

(51) Int. Cl.
    *H04L 27/26* (2006.01)
    *H04W 72/21* (2023.01)
    *H04W 72/23* (2023.01)
(52) U.S. Cl.
    CPC ........ *H04L 5/0044* (2013.01); *H04L 27/2602* (2013.01); *H04W 72/21* (2023.01); *H04W 72/23* (2023.01)
(58) Field of Classification Search
    CPC ............ H04L 5/0044; H04W 72/0413; H04W 72/042; H04W 72/04
    USPC ........................................................ 370/329
    See application file for complete search history.

(56) References Cited

U.S. PATENT DOCUMENTS

| | | | |
|---|---|---|---|
| 2014/0086078 A1* | 3/2014 | Malladi ............... | H04W 72/042 370/252 |
| 2016/0100398 A1 | 4/2016 | Xia et al. | |
| 2018/0102931 A1* | 4/2018 | Ko ...................... | H04L 27/2613 |
| 2018/0132269 A1* | 5/2018 | Wang ................... | H04L 5/0057 |

FOREIGN PATENT DOCUMENTS

| | | |
|---|---|---|
| JP | 2016-527758 A | 9/2016 |
| WO | 2014/177000 A1 | 11/2014 |

OTHER PUBLICATIONS

Written Opinion of the International Searching Authority issued in PCT/JP2018/037597 mailed on Dec. 11, 2018 (4 pages).
LG Electronics; "Considerations on UCI and UL channel multiplexing for NR"; 3GPP TSG RAN WG1 Meeting 90bis, R1-1717962; Prague, CZ; Oct. 9-13, 2017 (14 pages).
NTT Docomo, Inc.; "UCI multiplexing"; 3GPP TSG RAN WG1 NR Ad-Hoc#3, R1-1716102; Nagoya, Japan; Sep. 18-21, 2017 (6 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Extended European Search Report issued in counterpart European Patent Application No. 18865850.4, mailed on Jun. 10, 2021 (6 pages).
InterDigital Inc.; "On UCI resource mapping on PUSCH"; 3GPP TSG RAN WG1 Meeting NR#3, R1-1716480; Nagoya, Japan; Sep. 18-21, 2017 (3 pages).
Vivo; "On UCI multiplexing"; 3GPP TSG RAN WG1 Meeting NR#3, R1-1715640; Nagoya, Japan; Sep. 18-21, 2017 (4 pages).
Intel Corporation; "UCI embedding and PUSCH/PUCCH multiplexing"; 3GPP TSG RAN WG1 Meeting 90bis, R1-1717388; Prague, CZ; Oct. 9-13, 2017 (7 pages).
Nokia, Nokia Shanghai Bell; "On multiplexing of UCI"; 3GPP TSG-RAN WG1 NR Ad-Hoc #3, R1-1716145; Nagoya, Japan; Sep. 18-21, 2017 (7 pages).
Office Action in counterpart Taiwanese Application No. 107135786 mailed Jul. 27, 2021 (10 pages).
Office Action issued in the counterpart Indian Patent Application No. 202037018795, mailed on Mar. 28, 2022 (6 pages).
Office Action issued in the counterpart ARIPO Patent Application No. AP/P/2020/012366, mailed on Mar. 29, 2022 (5 pages).
Notice of Reasons for Refusal for Japanese Patent Application No. 2019-548196 mailed on Aug. 2, 2022 (7 pages).
Office Action issued in the counterpart European Patent Application No. 18865850.4, mailed on Jun. 17, 2022 (4 bages).
Office Action issued in the counterpart ARIPO Patent Application No. AP/P/2020/012366, mailed on Jun. 22, 2022 (5 pages).
Office Action issued in Chinese Application No. 201880066306.3; Dated Sep. 23, 2022 (14 pages).
Office Action issued in the counterpart African Application No. AP/P/2020/012366, mailed Apr. 11, 2023 (5 pages).
Office Action issued in European Application No. 18865850.4; Dated Sep. 4, 2023 (11 pages).
Office Action issued in counterpart Saudi Arabian Patent Application No. 520411756 mailed on Dec. 4, 2023 (12 pages).

\* cited by examiner

USER TERMINAL AND RADIO COMMUNICATION METHOD

TECHNICAL FIELD

The present invention relates to a user terminal and a radio communication method in next-generation mobile communication systems.

BACKGROUND ART

In the Universal Mobile Telecommunications System (UMTS) network, the specifications of long-term evolution (LTE) have been drafted for the purpose of further increasing high speed data rates, providing lower delays and so on (see non-patent literature 1). In addition, successor systems of LTE are also under study for the purpose of achieving further broadbandization and increased speed beyond LTE (referred to as, for example, "LTE-Advanced (LTE-A)," "Future Radio Access (FRA)," "4G," "5G," "5G+ (plus)," "New RAT (NR)," "LTE Rel. 14," "LTE Rel. 15 (or later versions)," and so on).

The uplink (UL) in existing LTE systems (for example, LTE Rel. 8 to 13) supports the DFT-spread OFDM (DFT-S-OFDM (Discrete Fourier Transform-Spread-Orthogonal Frequency Division Multiplexing)) waveform. The DFT-spread OFDM waveform is a single-carrier waveform, so that it is possible to prevent the peak-to-average power ratio (PAPR) from increasing.

Also, in existing LTE systems (for example, LTE Rel. 8 to 13), a user terminal transmits uplink control information (UCI) by using an uplink data channel (for example, Physical Uplink Shared Channel (PUSCH)) and/or an uplink control channel (for example, Physical Uplink Control Channel (PUCCH)).

This transmission of UCI is controlled based on whether simultaneous transmission of PUSCH and PUCCH ("simultaneous PUSCH and PUCCH transmission") is configured, and whether PUSCH is scheduled within the TTI where this UCI is transmitted. Transmission of UCI using PUSCH is also referred to as "UCI on PUSCH."

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In existing LTE systems (for example, LTE Rel. 8 to 13), when the timing to transmit uplink data (for example, UL-SCH) and the timing to transmit uplink control information (UCI) overlap, the uplink data and the UCI are transmitted using an uplink shared channel (PUSCH) (UCI on PUSCH). Even in future radio communication systems (for example, LTE Rel. 14 or later versions, 5G or NR), it may be possible to transmit uplink data and UCI by using PUSCH, as in existing LTE systems.

Meanwhile, future radio communication systems have agreed on placing the reference signal for use for demodulating (demodulation reference signal, such as DMRS) an uplink shared channel in locations that are different from those in existing LTE systems. Thus, when the demodulation reference signal for an uplink shared channel is placed in different locations than existing LTE systems, there is a possibility that the accuracy of channel estimation degrades, and the characteristics of uplink control information deteriorate.

It is therefore an object of the present disclosure to provide a user terminal and a radio communication method that can prevent characteristics of uplink control information, which is transmitted using an uplink shared channel, from deteriorating.

Solution to Problem

According to one aspect of the present invention, a user terminal has a transmission section that transmits uplink control information by using an uplink shared channel, and a control section that selects resource elements, which are provided at given frequency intervals, and which are for mapping the uplink control information, in a symbol adjacent to a symbol for a demodulation reference signal for the uplink shared channel.

Advantageous Effects of Invention

According to one aspect of the present invention, it is possible to prevent characteristics of uplink control information, which is transmitted using an uplink shared channel, from deteriorating.

DESCRIPTION OF EMBODIMENTS

In UL communication in existing LTE systems, assuming that transmission of UCI and transmission of uplink data (UL-SCH) might take place at the same timing, the method for multiplexing and transmitting UCI and uplink data on a PUSCH (also referred to as "UCI piggyback on PUSCH," "UCI on PUSCH" and/or the like) is supported. By using UCI on PUSCH, it is possible to achieve low Peak-to-Average Power Ratios (PAPRs) and/or low inter-modulation distortion (IMD) in UL communication.

Research is also underway on supporting UCI on PUSCH in UL communication in future radio communication systems (for example, LTE Rel. 14 or later versions, 5G, NR, etc.).

Figure 1A:
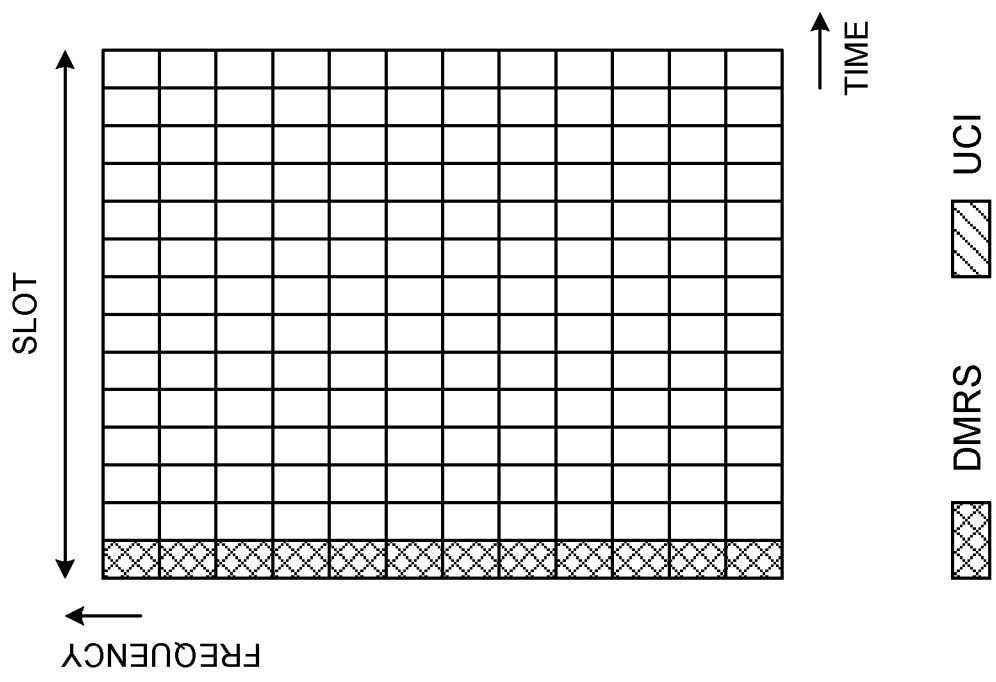
FIG. 1A is a diagram to show an example of how the DMRS for PUSCH is placed in existing LTE systems.
Figure 1B:
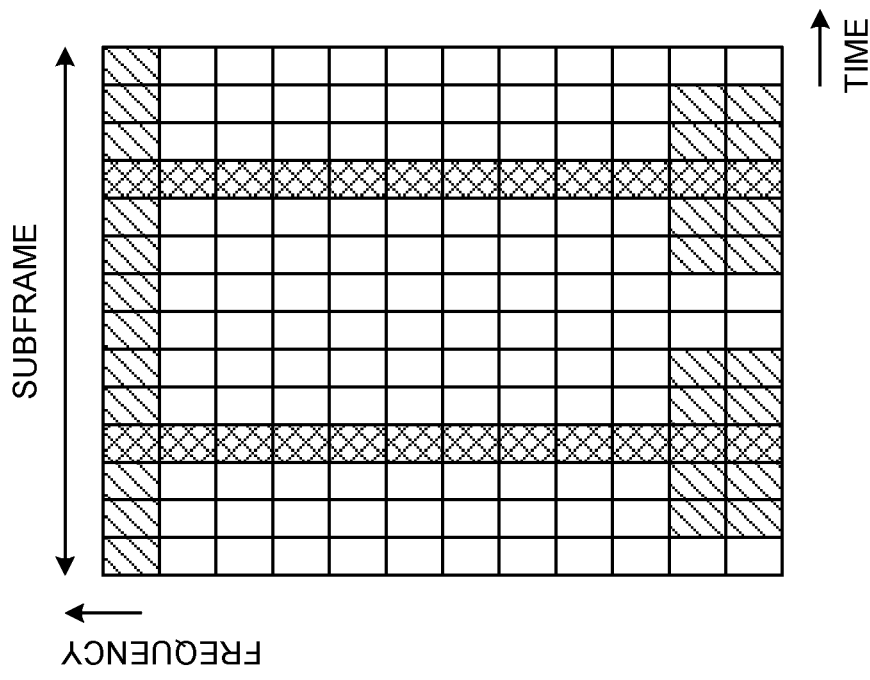
FIG. 1B is a diagram to show an example of how the DMRS is placed in future radio communication systems.

Also, in existing LTE systems, the reference signal for demodulating PUSCH (also referred to as "DeModulation Reference Signal (DMRS)") is placed in two symbols in a subframe (for example, in the fourth symbol and the eleventh symbol) (see FIG. 1A). Meanwhile, future radio communication systems agree on placing the DMRS for PUSCH at the head of a subframe (or slot) in UL communication (see FIG. 1B). In this way, PUSCH configurations that are different from ones used in existing LTE systems are adopted in future radio communication systems, so that it is desirable to employ UCI on PUSCH, which is suitable to such PUSCH configurations.

Figure 2:
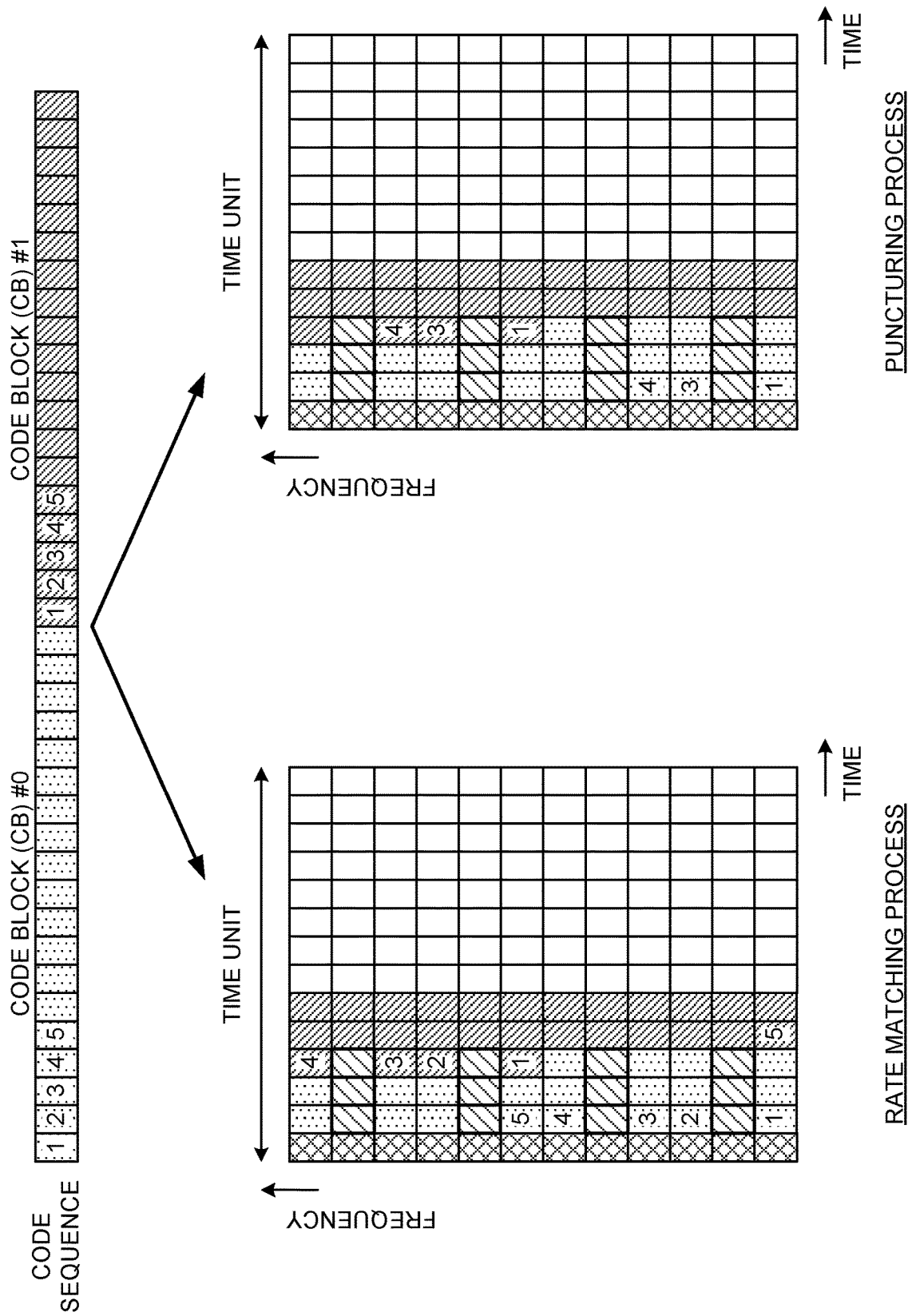
FIG. 2 is a diagram to explain a case where a rate matching process and a puncturing process are used in a method of mapping UCI.

It may be possible to introduce a rate matching process and/or a puncturing process in the method of multiplexing uplink control information (UCI) on PUSCH. FIG. 2 shows a case where UCI is multiplexed by applying a rate matching process or a puncturing process to uplink data that is transmitted in a plurality of code blocks (here, in CB #0 and CB #1).

FIG. 2 shows a UCI multiplexing method for use when uplink data is transmitted on PUSCH on a per code block (CB) basis. CBs are units that are formed by dividing a transport block (TB).

In existing LTE systems, when the size of a transport block (Transport Block Size (TBS)) exceeds a given threshold (for example, 6144 bits), the TB is divided into one or more segments (code blocks (CBs)) and encoded in segment units (code block segmentation). Each encoded code block is concatenated and transmitted. TBS refers to the size of a transport block, which is a unit of information bit sequences. One or more TBs are allocated to one subframe.

The rate matching process refers to controlling the number of encoded bits by taking into account the radio resources that are actually available for use. That is, the coding rate of uplink data is controlled to change depending on the number of UCIs multiplexed (see FIG. 2). To be more specific, as shown in FIG. 2, control is exerted so that CB sequences (1 to 5) are not allocated to the locations where UCI is multiplexed. By this means, while code sequences of uplink data can be multiplexed without damage, it is still not possible to receive the data properly unless the radio base station and user terminals share in common the locations where UCI is multiplexed.

Also, in the puncturing process, encoding is executed on assumption that resources that are allocated for data are all available for use, and so encoded symbols are not mapped to resources (free resources) that are actually not available for use (for example, UCI resources). That is, UCI is overwritten where uplink data code sequences are mapped (see FIG. 2). To be more specific, as shown in FIG. 2, even in locations where UCI is multiplexed, CB sequences (1 to 5) are allocated, and UCI-multiplexed sequences (2 and 5) are overwritten by UCI. As a result of this, the locations of other code sequences are not affected, so that, even when inconsistencies arise between the radio base station and user terminals in the understanding of how UCI is multiplexed, the data can be received properly, and more easily.

UCI on PUSCH for future radio communication systems is designed so that at least part of the resources (for example, one or more resource elements (REs)) that are allocated to UL data are subjected to a rate matching process and/or a puncturing process, and UCI is mapped on these resources. However, when UCI is mapped to resources that are more distant from resources where the DMRS is placed, the UCI might have more deteriorated characteristics due to degradation in the accuracy of channel estimation.

FIG. 3 are diagrams to show examples of mapping of UCI. FIG. 3 illustrate example cases where uplink data (CB) is first mapped in the frequency direction and then mapped in the time direction (frequency-first mapping is applied). Note that the method of mapping uplink data is not limited to frequency-first mapping, and the method of mapping uplink data first in the time direction and then in the frequency direction (time-first mapping) may be used as well.

Figure 3B:
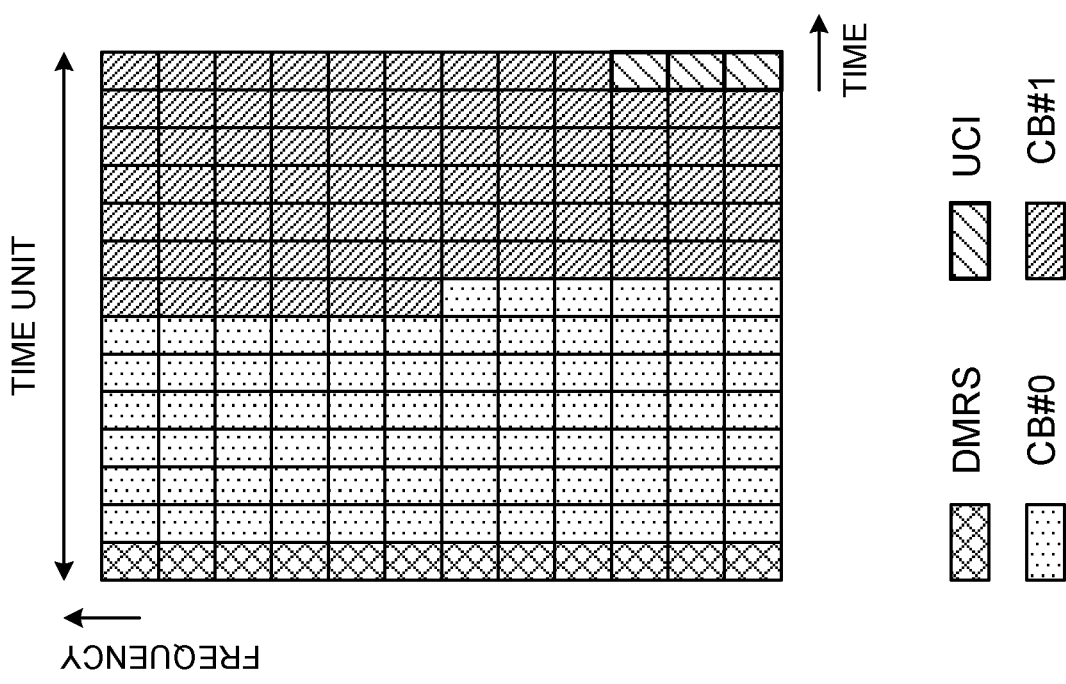
FIGS. 3A and 3B are diagrams to show examples of mapping of UCI.
Figure 3A:
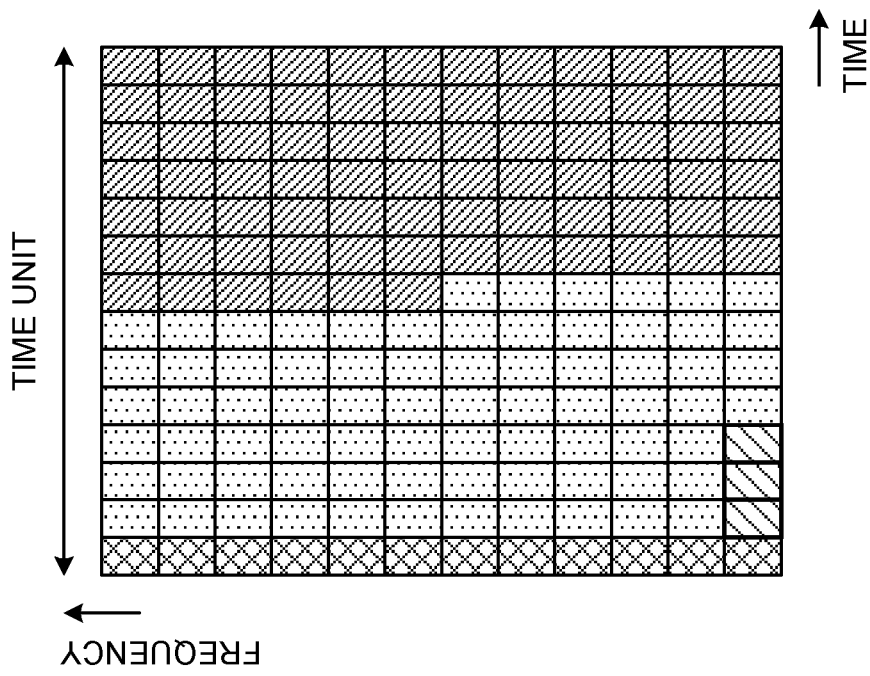

For example, as shown in FIG. 3A, if UCI is multiplexed continuously along the time direction, there is a possibility that the accuracy of channel estimation varies in every symbol where the UCI is mapped, and, as a result of this, the UCI's characteristics might deteriorate. Also, as shown in FIG. 3B, if UCI is multiplexed continuously along the frequency direction, in symbols in which UCI is mapped and which are more distant from the DMRS, the UCI might have more deteriorated characteristics due to degradation in the accuracy of channel estimation.

In FIGS. 3A and 3B, where a plurality of CBs constitute uplink data, specific CBs (for example, CB #0 in FIG. 3A and CB #1 in FIG. 3B) are punctured. In this way, when the volume of puncturing varies among multiple CBs, there is a possibility that specific CBs might deteriorate. However, even if a CB that demonstrates high accuracy of channel estimation deteriorates, it is more likely this CB's deterioration has little impact.

So, the present inventors have focused on the point that, when uplink data, which is divided into one or more CBs (blocks), and UCI are transmitted using PUSCH (uplink shared channel), the deterioration of CBs that are mapped in locations closer to the DMRS (that is, CBs where channel estimation shows high accuracy) is likely to have little impact, and come up with the idea of preventing characteristics of UCI from deteriorating due to degradation in the accuracy of channel estimation by mapping UCI to symbols that are at least adjacent to the DMRS.

Now, the present embodiment will be described below in detail. Note that, according to the present embodiment, UCI may contain at least one of a scheduling request (SR), delivery acknowledgment information (also referred to as Hybrid Automatic Repeat reQuest-Acknowledgement (HARQ-ACK), "ACK" or "NACK (Negative ACK)," "A/N," and so on) in response to a downlink data channel (for example, Physical Downlink Shared CHannel (PDSCH)), channel state information (CSI), beam index information (BI), and a buffer status report (BSR).

Note that in the following description, although two or three CBs are mapped in a time unit where PUSCH is allocated, the number of CBs mapped to that time unit has only to be one or more. Also, the present embodiment may be applied to given blocks other than CBs.

In the present embodiment, a user terminal transmits uplink data (for example, a TB), which is divided into one or more blocks (for example, CBs), and UCI, by using an uplink shared channel (for example, PUSCH). The user terminal controls mapping of UCI in symbols that are at least adjacent to the demodulation reference signal (for example, DMRS) for the uplink shared channel.

To be more specific, the user terminal may control mapping (insertion) of UCI in continuous and/or discontinuous resources (for example, REs) in the frequency direction, in symbols that are adjacent to the DMRS.

Figure 4A:
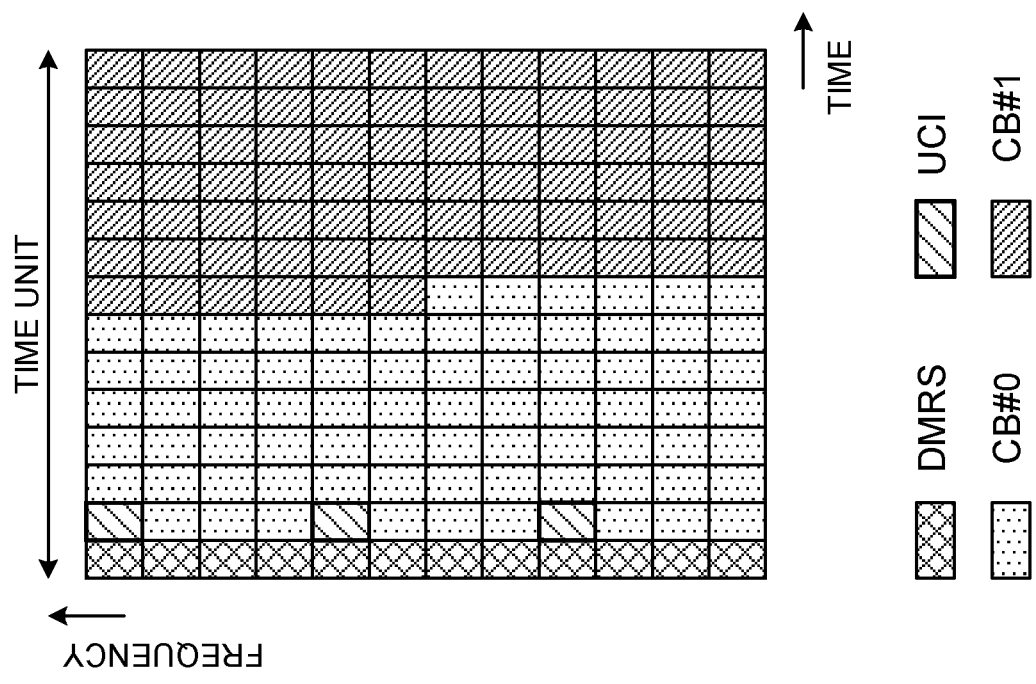
FIGS. 4A and 4B are diagrams to show examples of mapping of UCI according to the present embodiment.
Figure 4B:
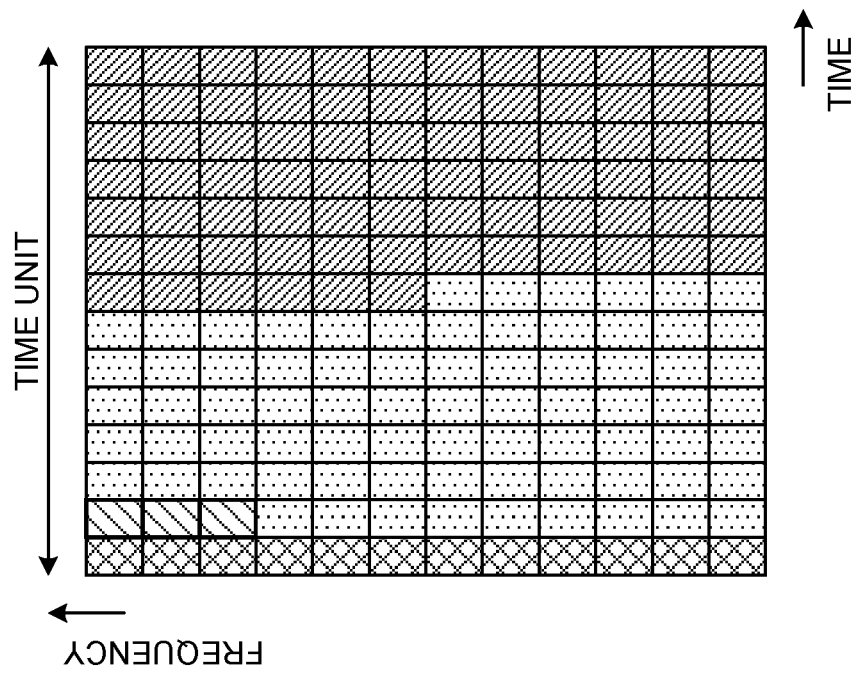

FIG. 4 are diagrams to show examples of mapping of UCI according to the present embodiment. In FIGS. 4A and 4B, the DMRS is mapped to the first symbol in the time unit (which is, for example, a slot) allocated to PUSCH, but this is by no means limiting. For example, in FIGS. 4A and 4B, the DMRS may be placed in other symbols in this time unit, or may be placed in more than one symbol.

Also, in FIGS. 4A and 4B, the DMRS is placed in all the REs in the frequency resources (also referred to as "one or more resource blocks (RBs, Physical Resource Blocks (PRBs)," etc.)) that are allocated to PUSCH, but this is by no means limiting. Within the frequency resources allocated to PUSCH, the DMRS may be placed in REs that are continuous and/or discontinuous in the frequency direction.

Furthermore, cases will be described below as examples, with reference to FIGS. 4A and 4B, where uplink data is divided into two CBs #0 and #1, and where CBs #0 and #1 are first mapped in the frequency direction and then mapped in the time direction (frequency-first mapping). Note that the number of CBs to constitute uplink data is not limited to two, as long as it is greater than or equal to one.

Also, in FIGS. 4A and 4B, the time unit (which is, for example, a slot) allocated to PUSCH is comprised of fourteen symbols, but the number of symbols to constitute the time unit is not limited to fourteen. Furthermore, in FIGS. 4A and 4B, the frequency resources allocated to PUSCH are one PRB that consists of twelve subcarriers, but it is equally possible to allocate two or more PRBs to PUSCH.

As shown in FIG. 4A, in symbols that are at least adjacent to the DMRS (for example, in FIG. 4A, the second symbol in the time unit), the user terminal may map UCI to a plurality of REs that are continuous in the frequency direction. For example, in FIG. 4A, UCI is mapped to three REs that are continuous in the frequency direction. Note that the number of REs to which UCI is mapped is not limited to three.

As shown in FIG. 4A, by mapping UCI to a plurality of REs that are consecutive in the frequency direction, in symbols that are adjacent to the DMRS, it is possible to prevent the UCI's characteristics from deteriorating due to degradation in the accuracy of channel estimation, and implement the configuration for UCI on PUSCH in a more simple way.

Also, as shown in FIG. 4B, the user terminal may map UCI to a plurality of REs that are discontinuous (discrete) in the frequency direction, within a symbol that is at least adjacent to the DMRS. For example, in FIG. 4A, UCI is mapped to a plurality of REs at given intervals in the frequency direction (here, three REs at intervals of four subcarriers). Note that the number of REs to which UCI is mapped is not limited to three, and the given intervals at which UCI is mapped are not limited to four-subcarrier intervals either.

As shown in FIG. 4B, by mapping UCI REs that are discontinuous in the frequency direction in a symbol that is adjacent to the DMRS, the UCI can have a frequency diversity effect, while preventing the UCI's characteristics from deteriorating due to degradation in the accuracy of channel estimation.

Figure 5:
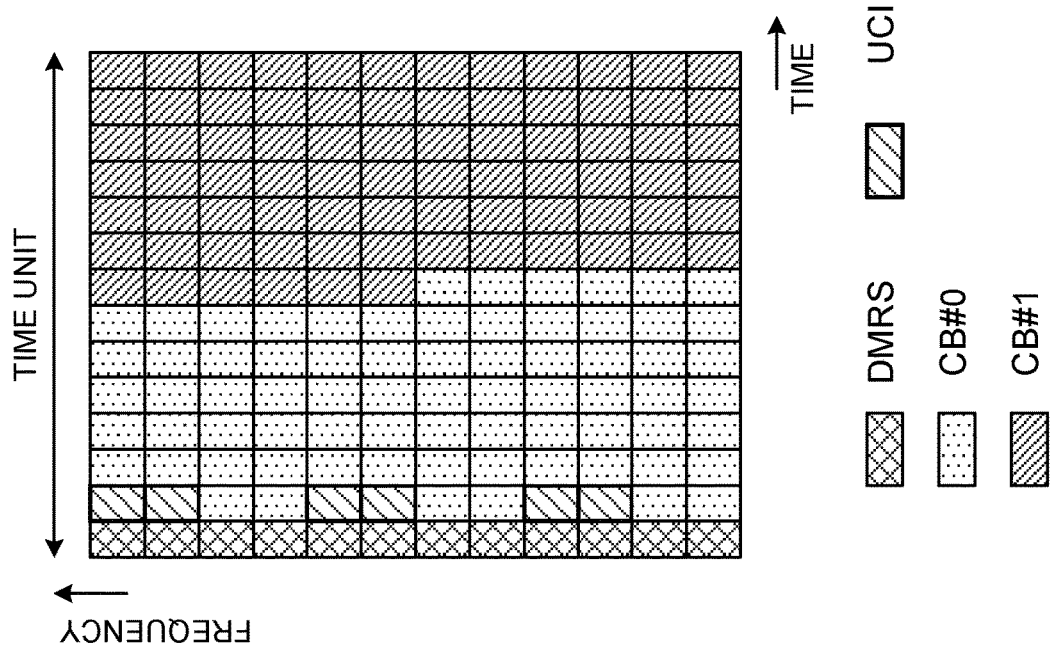
FIG. 5 is a diagram to show another example of mapping of UCI according to the present embodiment.

FIG. 5 is a diagram to show another example of mapping of UCI according to the present embodiment. FIG. 5 holds the same assumption as in FIGS. 4A and 4B. Hereinafter, differences from FIGS. 4A and 4B will be primarily described.

As shown in FIG. 5, in a symbol that is at least adjacent to the DMRS (for example, in FIG. 5, the second symbol in the time unit), the user terminal may map UCI to REs that are continuous and discontinuous in the frequency direction.

To be more specific, UCI may be mapped to a plurality of groups (also referred to as "resource element groups (REGs)" and/or the like), each including a plurality of REs that are continuous in the frequency direction. As shown in FIG. 5, multiple REGs may be placed discretely in the frequency direction (they may be discontinuous in the frequency direction).

For example, in FIG. 5, each REG contains two REs that are continuous in the frequency direction, and UCI is mapped to three REGs at given intervals (for example, every four subcarriers). Note that each REG has only to contain one or more REs. The given intervals at which REGs are placed are not limited to what is shown in FIG. 5, and, for example, one REG may be included for a given number of PRBs (for example, one PRB).

As shown in FIG. 5, by mapping UCI to multiple REGs in a symbol that is adjacent to the DMRS, the UCI can have a frequency diversity effect, while preventing the UCI's characteristics from deteriorating due to degradation in the accuracy of channel estimation.

Note that, in FIG. 4 and FIG. 5, in resources where UCI is mapped (for example, one or more REs), CBs (for example, CB #0 in FIG. 4 and FIG. 5) may be punctured, and/or rate matching may be applied. Furthermore, resources for rate matching and resources for puncturing may be selected separately.

Figure 6:
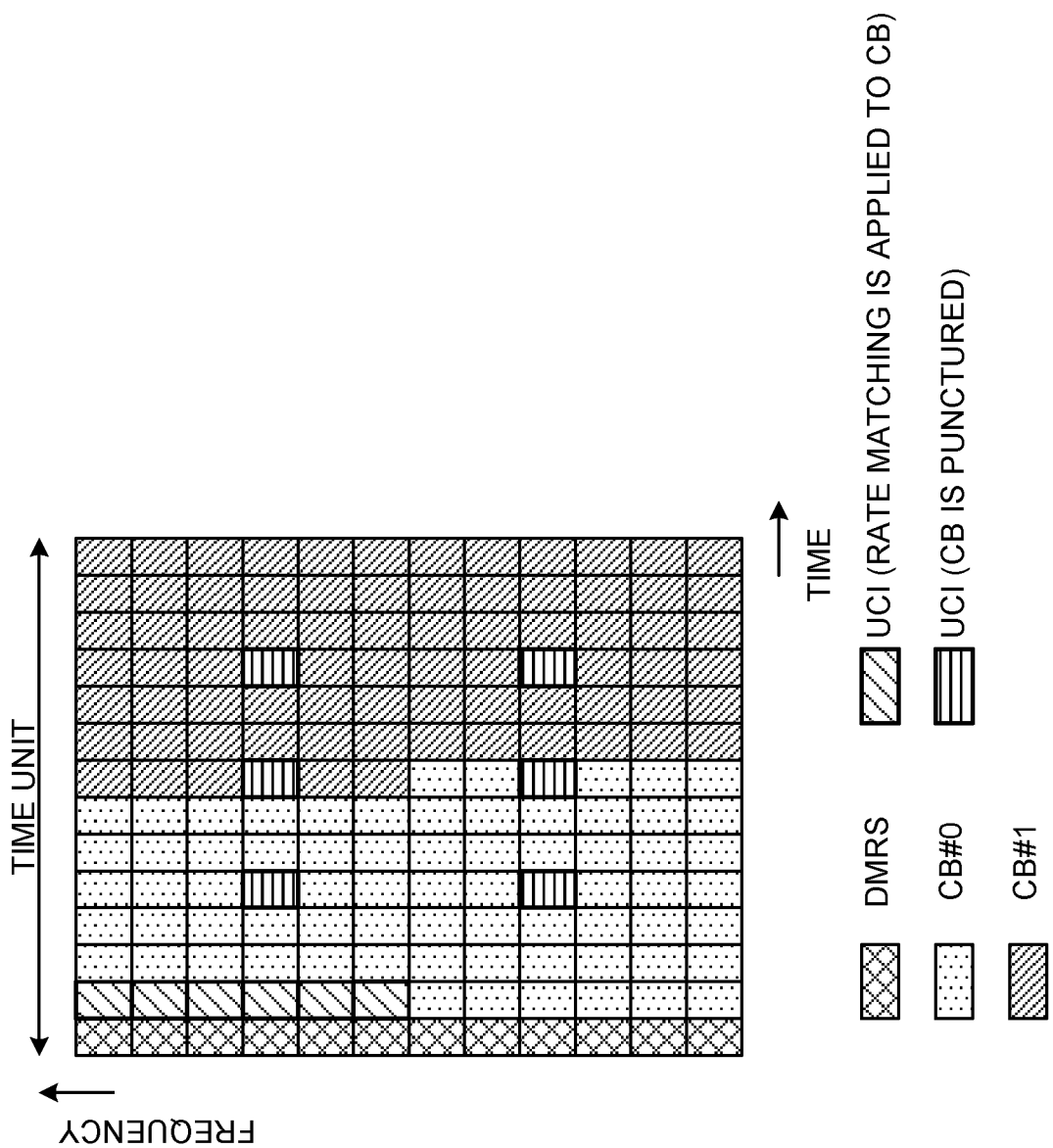
FIG. 6 is a diagram to show another example of mapping of UCI according to the present embodiment.

FIG. 6 is a diagram to show another example of mapping of UCI according to the present embodiment. FIG. 6 holds the same assumption as in FIGS. 4A and 4B. Hereinafter, differences from FIGS. 4A and 4B will be primarily described.

As shown in FIG. 6, the user terminal may map UCI to one or more symbols (for example, in FIG. 6, the fifth, eighth, and eleventh symbols in the time unit) that are discrete in the time direction, within the time unit that is allocated to PUSCH, in addition to symbols that are adjacent to the DMRS (for example, in FIG. 6, the second symbol in the time unit).

Also, as shown in FIG. 6, when UCI is mapped to multiple symbols within the time unit that is allocated to PUSCH, rate matching may be applied to CB #0 in a given number of REs in symbols that are adjacent to the DMRS, and CB #0 or #1 may be punctured in a given number of REs in symbols that are not adjacent to the DMRS.

Also, as shown in FIG. 6, the resources that are subject to rate matching may be comprised of REs that are continuous in the frequency direction, and the resources that are subject to puncturing may be comprised of REs that are discontinuous in the frequency direction. Whether UCI is mapped to resources subject to rate matching or to resources subject to puncturing may be controlled based on the type of the UCI (for example, at least one of HARQ-ACK, CSI, and SR) and/or the timing of PDSCH corresponding to HARQ-ACK.

As shown in FIG. 6, in addition to symbols that are adjacent to the DMRS, if UCI is mapped to one or more symbols that are discrete in the time direction, the UCI can be mapped to appropriate resources depending on the type of the UCI, and so forth.

Figure 7B:
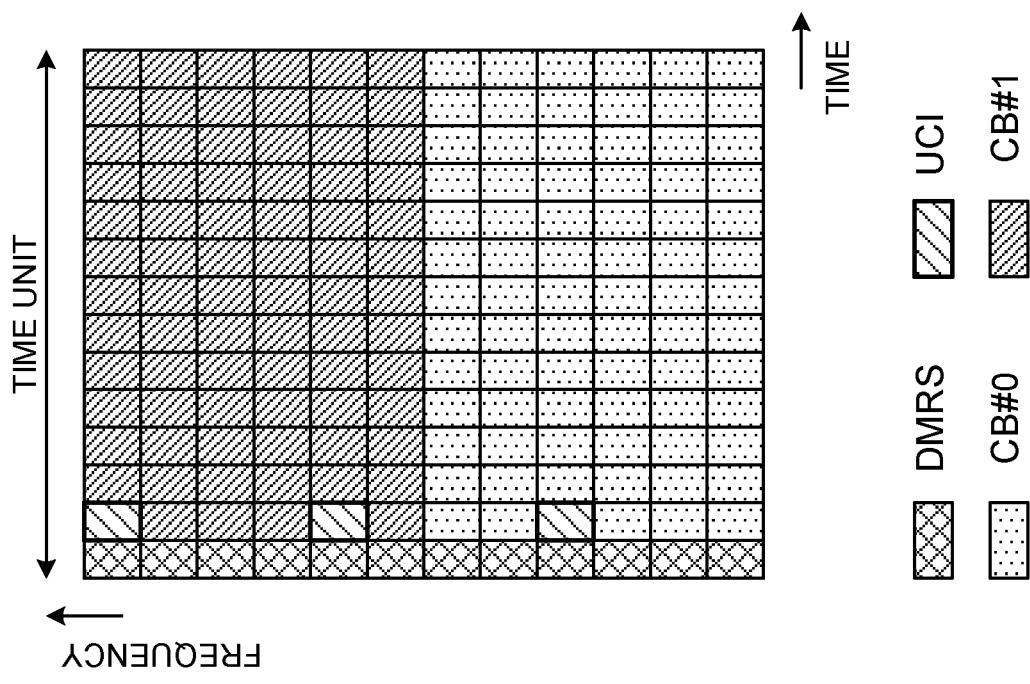
FIGS. 7A and 7B are diagrams to show other examples of mapping of UCI according to the present embodiment.
Figure 7A:
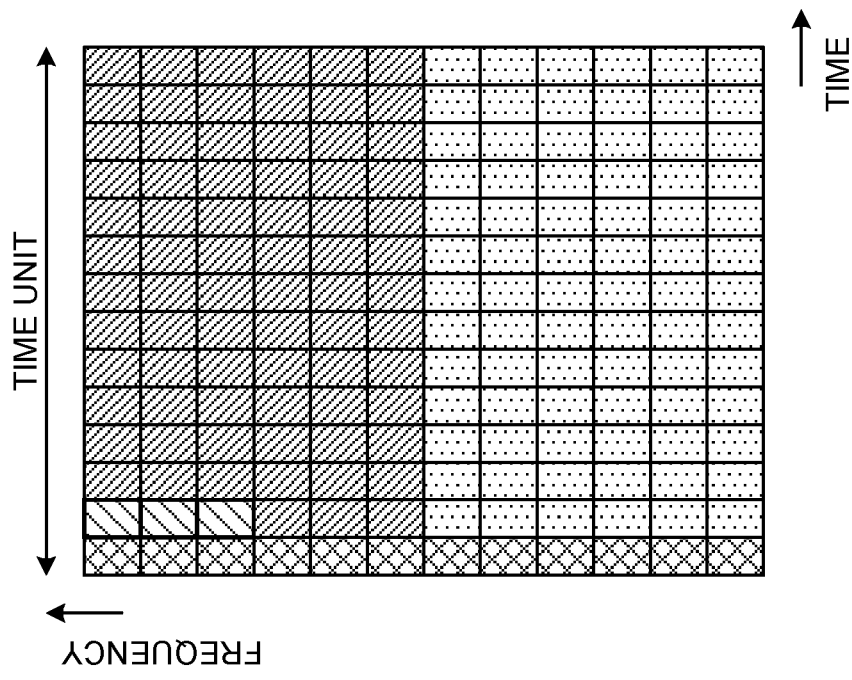

FIG. 7 are diagrams to show yet other examples of mapping of UCI according to the present embodiment. FIGS. 7A and 7B are different from FIGS. 4A and 4B in that CBs #0 and #1 are mapped first in the time direction and then mapped in the frequency direction (time-first mapping).

As shown in FIGS. 7A and 7B, even when time-first mapping is applied to one or more CBs, in symbols that are at least adjacent to the DMRS, the user terminal may map UCI to continuous or discontinuous REs. In addition, it is obvious that the UCI mapping configurations shown in FIG. 5 and FIG. 6 can be used when mapping one or more CBs based on time-first mapping.

When, as shown in FIG. 7B, one or more CBs are mapped based on time-first mapping and UCI is mapped REs that are discontinuous in the frequency direction in a symbol that is adjacent to the DMRS, it is possible to allow the number of times UCI is mapped (for example, the volume of puncturing) to vary less between CBs.

With the present embodiment described above, the locations where UCI is mapped may be controlled based on the type of the UCI (for example, at least one of HARQ-ACK, CSI and SR). For example, HARQ-ACK and/or SR may be mapped to given REs in symbols adjacent to the DMRS. Also, CSI may be mapped to given REs in symbols that are not adjacent to the DMRS.

Also, according to the present embodiment, resources where UCI is mapped may be determined in advance in the specification, and/or may be configured by higher layer signaling (for example, by using at least one of RRC signaling, system information and broadcast information). Also, given offsets (for example, cell-specific offsets and/or user terminal-specific offsets) may be applied to resources where UCI is mapped.

Also, resources where the DMRS for PUSCH is mapped in the present embodiment may be determined in advance in the specification, and/or may be configured by higher layer signaling (for example, by using at least one of RRC signaling, system information and broadcast information). Also, given offsets (for example, cell-specific offsets and/or user terminal-specific offsets) may be applied to resources where the DMRS is mapped.

In addition, when UCI is inserted in one or more CBs, in what order the UCI is to be inserted is not particularly limited. Where there are multiple CBs (for example, three CBs #0 to #2), the UCI may be inserted (or multiplexed) in these CBs one by one (for example, in CB #0, CB #1, CB #2, CB #0, and so on), or the UCI may be multiplexed on a specific CB and then on subsequent CBs (for example, on CB #0, CB #0, CB #0, CB #1, and so on). Also, in locations where UCI is multiplexed, an interleaving process may be applied to one or more CBs.

Although the first to third aspects have been illustrated above as examples where the time duration of the time unit (which is, for example, a slot, a minislot, etc.) to which PUSCH is allocated is fourteen symbols, this time duration is by no means limiting. For example, PUSCH may be allocated to a time unit that is two, three or seven symbols long in time.

(Radio Communication System)

Now, the structure of a radio communication system according to the present embodiment will be described below. In this radio communication system, each radio communication method according to the above-described aspects is employed. Note that the radio communication methods according to the herein-contained aspects of the present invention may be applied individually, or at least two or more of them may be combined and applied.

Figure 8:
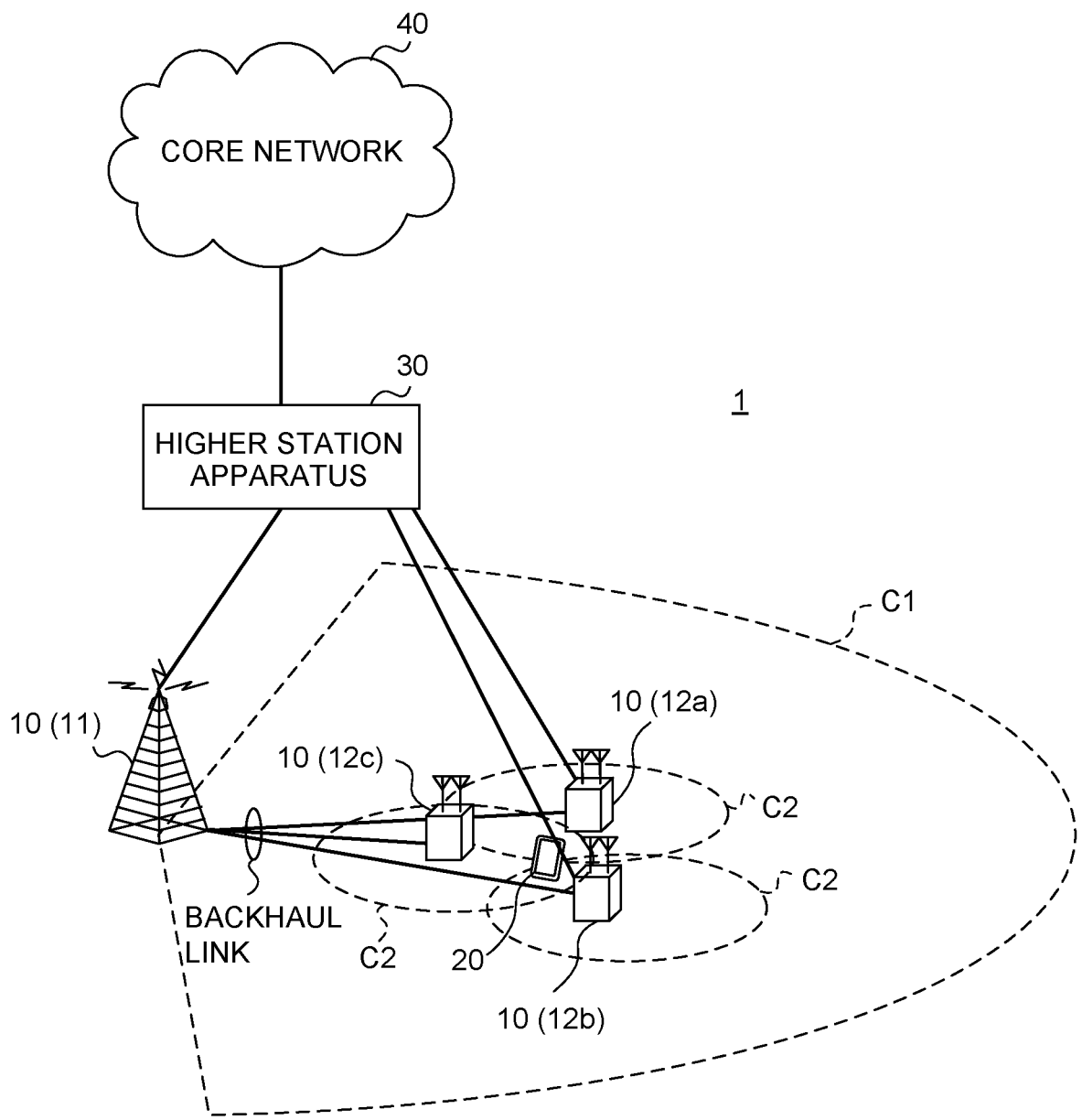
FIG. 8 is a diagram to show an example of a schematic structure of a radio communication system according to an embodiment of the present invention.

FIG. 8 is a diagram to show an example of a schematic structure of a radio communication system according to an embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be referred to as "SUPER 3G," "LTE-Advanced (LTE-A)," "IMT-Advanced," "4G," "5G," "Future Radio Access (FRA)," "New RAT (NR)" and so on.

The radio communication system 1 shown in FIG. 8 includes a radio base station 11 that forms a macro cell C1, and radio base stations 12a to 12c that form small cells C2, which are placed within the macro cell C1 and which are narrower than the macro cell C1. Also, user terminals 20 are placed in the macro cell C1 and in each small cell C2. A configuration to apply different numerologies between cells may be adopted. Note that a "numerology" refers to a set of communication parameters that characterize the design of signals in a given RAT and/or the design of the RAT.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using a plurality of cells (CCs) (for example, two or more CCs). Furthermore, the user terminals can use licensed-band CCs and unlicensed-band CCs as a plurality of cells.

Furthermore, the user terminals 20 can communicate by using time division duplexing (TDD) or frequency division duplexing (FDD) in each cell. A TDD cell and an FDD cell may be referred to as a "TDD carrier (frame configuration type 2)," and an "FDD carrier (frame configuration type 1)," respectively.

Also, in each cell (carrier), either subframes having a relatively long time duration (for example, 1 ms) (also referred to as "TTIs," "normal TTIs," "long TTIs," "normal subframes," "long subframes," "slots," and/or the like), or subframes having a relatively short time duration (also referred to as "short TTIs," "short subframes," and/or the like) may be applied, or both long subframes and short subframe may be used. Furthermore, in each cell, subframes of two or more time durations may be used.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, 30 to 70 GHz and so on) and a wide bandwidth may be used, or the same carrier as that used in the radio base station 11 may be used. Note that the configurations of the frequency band for use in each radio base station are by no means limited to these.

A structure may be employed here, in which wire connection (for example, optical fiber, which is in compliance with the Common Public Radio Interface (CPRI), the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNodeB (eNB)," a "transmission/reception point" and so on. Also, the radio base stations 12 are radio base stations having local coverages, and may be referred to as "small base stations," "micro base stations," "pico base stations," "femto base stations," "Home eNodeBs (HeNBs)," "Remote Radio Heads (RRHs)," "transmission/reception points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals. Furthermore, the user terminals 20 can perform inter-terminal (D2D) communication with other user terminals 20.

In the radio communication system 1, as radio access schemes, orthogonal Frequency Division Multiple Access (OFDMA) can be applied to the downlink (DL), and Single-Carrier Frequency Division Multiple Access (SC-FDMA) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combination of these, and OFDMA may be used in UL. SC-FDMA can also be applied to a side link (SL) that is used in inter-terminal communication.

In a radio communication system 1, a downlink data channel (Physical Downlink Shared CHannel (PDSCH), which is also referred to as, for example, "DL shared channel," and so on), which is shared by each user terminal 20, a broadcast channel (Physical Broadcast CHannel (PBCH)), L1/L2 control channels and/or other channels are used as DL channels. At least one of user data, higher layer control information and System Information Blocks (SIBs) is communicated in the PDSCH. Also, the Master Information Block (MIB) is communicated in the PBCH.

The L1/L2 control channels include DL control channels (Physical Downlink Control CHannel (PDCCH), Enhanced Physical Downlink Control CHannel (EPDCCH) and so on), Physical Control Format Indicator CHannel (PCFICH), Physical Hybrid-ARQ Indicator CHannel (PHICH) and so on. Downlink control information (DCI), including PDSCH and PUSCH scheduling information, is communicated by the PDCCH and/or the EPDCCH. The number of OFDM symbols to use for the PDCCH is communicated by the PCFICH. The EPDCCH is frequency-division-multiplexed with the PDSCH and used to communicate DCI and so on, like the PDCCH. PUSCH delivery acknowledgment information (A/N, HARQ-ACK, etc.) can be communicated in at least one of the PHICH, the PDCCH and the EPDCCH.

In the radio communication system 1, an uplink data channel (Physical Uplink Shared CHannel (PUSCH), which is also referred to as a "UL shared channel" and so on), which is shared by each user terminal 20, an uplink control channel (Physical Uplink Control CHannel (PUCCH)), a random access channel (Physical Random Access CHannel (PRACH)) and so on are used as UL channels. User data, higher layer control information and so on are communicated by the PUSCH. Uplink control information (UCI), including at least one of PDSCH delivery acknowledgement information (A/N, HARQ-ACK, etc.), channel state information (CSI) and so on, is communicated in the PUSCH or the PUCCH. By means of the PRACH, random access preambles for establishing connections with cells are communicated.

(Radio Base Station)

Figure 9:
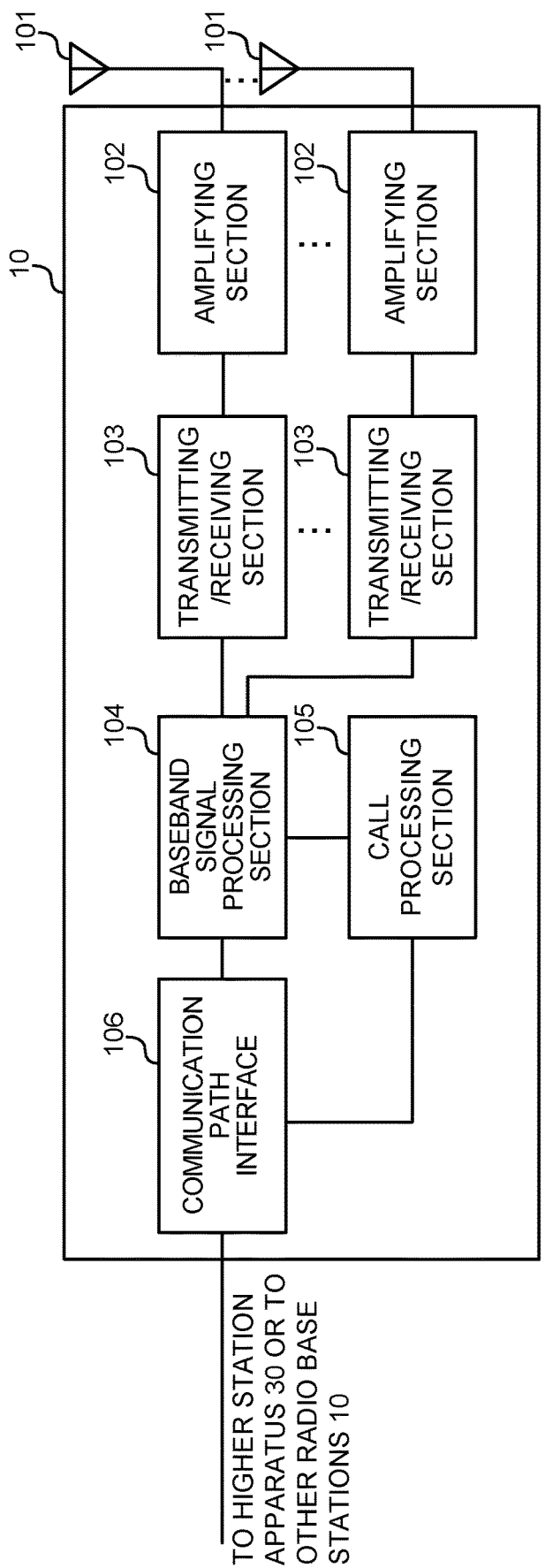
FIG. 9 is a diagram to show an example of an overall structure of a radio base station according to the present embodiment.

FIG. 9 is a diagram to show an example of an overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including, for example, at least one of a Packet Data Convergence Protocol (PDCP) layer process, division and coupling of the user data, Radio Link Control (RLC) layer transmission processes such as RLC retransmission control, Medium Access Control (MAC) retransmission control (for example, an Hybrid Automatic Repeat reQuest (HARQ) process), scheduling, transport format selection, channel coding, rate matching, scrambling, an inverse fast Fourier transform (IFFT) process and a precoding process, and the result is forwarded to the transmitting/receiving sections 103. Furthermore, downlink control signals are also subjected to transmission processes such as channel coding and/or an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, uplink data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs, for example, at least one of call processing such as setting up and releasing of communication channels, management of the state of the radio base station 10 and management of radio resources.

The communication path interface section 106 transmits and receives signals to and from the higher station apparatus 30 via a given interface. Also, the communication path interface 106 may transmit and/or receive signals (backhaul signaling) with neighboring radio base stations 10 via an inter-base station interface (for example, optical fiber, which is in compliance with the Common Public Radio Interface (CPRI), the X2 interface, etc.).

The transmitting/receiving sections 103 receive uplink data (CBs) and uplink control information (UCI) multiplexed over an uplink shared channel. The transmitting/receiving sections 103 may transmit information about resources (REs) that are punctured and/or subjected to rate matching in each CB. Also, the transmitting/receiving sections 103 may transmit information that represents at least one parameter that is used to determine the time position $t_{UCI}$ and the frequency position foci, where UCI is mapped.

Figure 10:
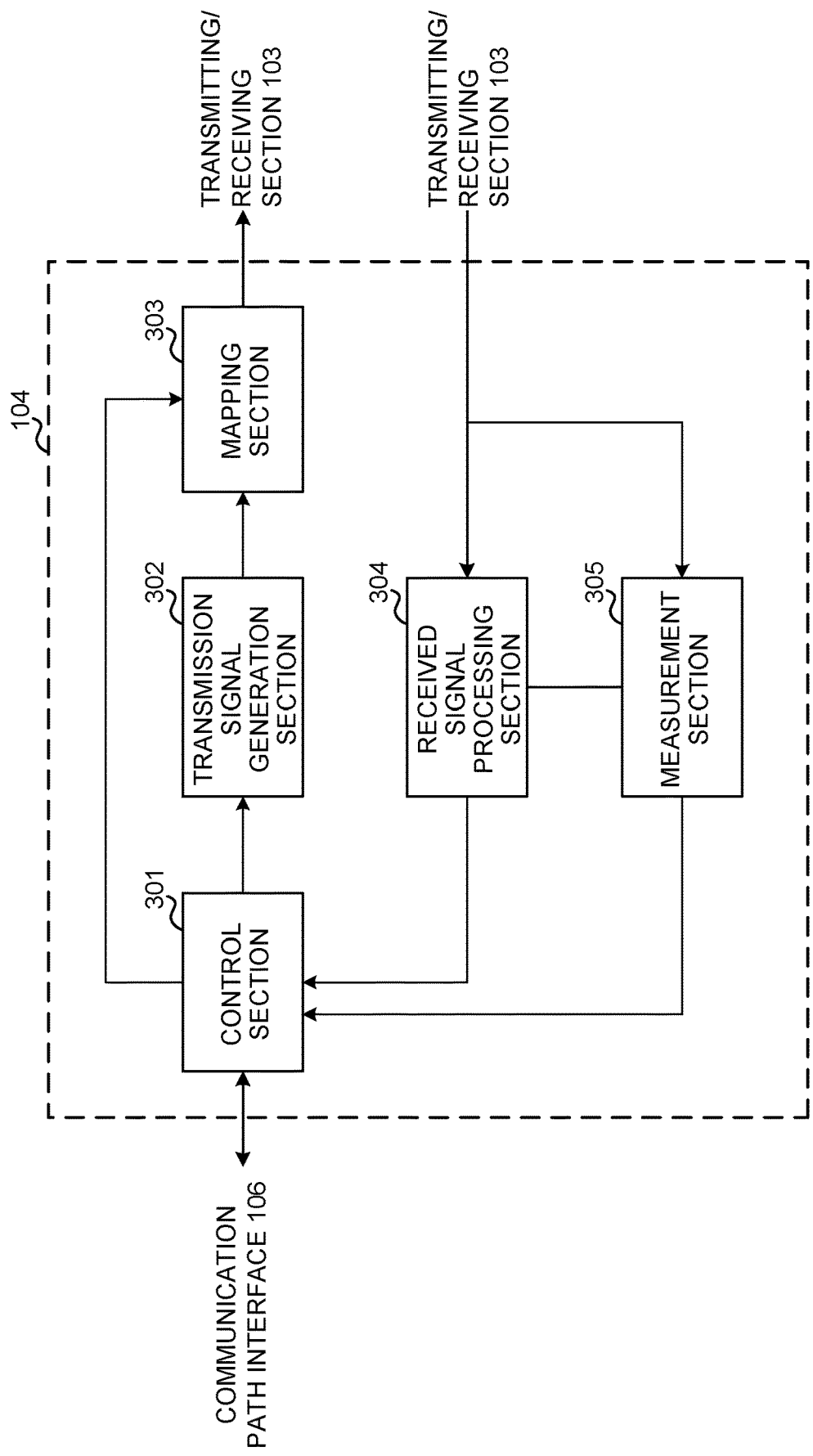
FIG. 10 is a diagram to show an example of a functional structure of a radio base station according to the present embodiment.

FIG. 10 is a diagram to show an example of a functional structure of a radio base station according to the present embodiment. Note that, although FIG. 10 primarily shows functional blocks that pertain to characteristic parts of the present embodiment, the radio base station 10 has other functional blocks that are necessary for radio communication as well. As shown in FIG. 10, the baseband signal processing section 104 has a control section 301, a transmission signal generation section 302, a mapping section 303, a received signal processing section 304 and a measurement section 305.

The control section 301 controls the whole of the radio base station 10. The control section 301 controls, for example, at least one of generation of downlink signals in the transmission signal generation section 302, mapping of downlink signals in the mapping section 303, receiving processes (for example, demodulation) for uplink signals in the received signal processing section 304 and measurements in the measurement section 305.

To be more specific, the control section 301 schedules user terminals 20. For example, the control section 301 controls the time units (for example, one or more slots) and/or the bandwidth (for example, one or more RBs) where the uplink shared channel is allocated. In addition, the control section 301 controls receipt of the uplink shared channel on which uplink data and uplink control information are multiplexed.

The control section 301 also controls demapping of UCI within the time units allocated to the uplink shared channel.

To be more specific, the control section 301 controls channel estimation using demodulation reference signals for the uplink shared channel, and controls demapping of UCI based on the result of channel estimation.

Also, the control section 301 may take into account the puncturing and/or rate matching of one or more blocks (CBs), into which uplink data is divided, for resources (for example, REs) where the UCI is mapped, to control the receiving processes (for example, demodulation and/or decoding) of these blocks.

The control section 301 can be constituted by a controller, a control circuit or control apparatus that can be described based on general understanding of the technical field to which the present invention pertains.

The transmission signal generation section 302 generates downlink signals (including downlink data signals, downlink control signals, downlink reference signals and/or other signals) as commanded by the control section 301, and outputs these signals to the mapping section 303.

The transmission signal generation section 302 can be constituted by a signal generator, a signal generation circuit or signal generation apparatus that can be described based on general understanding of the technical field to which the present invention pertains.

The mapping section 303 maps the downlink signals generated in the transmission signal generation section 302 to given radio resources as commanded by the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding, etc.) for uplink signals transmitted from the user terminals 20 (including, for example, uplink data signals, uplink control signals, uplink reference signals and/or other signals). To be more specific, the received signal processing section 304 may output the received signals and/or the signals after receiving processes to the measurement section 305. In addition, the received signal processing section 304 performs UCI receiving processes based on which uplink control channel configuration is specified by the control section 301.

The measurement section 305 conducts measurements with respect to the received signals. The measurement section 305 can be constituted by a measurer, a measurement circuit or measurement apparatus that can be described based on general understanding of the technical field to which the present invention pertains.

The measurement section 305 may measure the channel quality of the UL based on, for example, the received power (for example, Reference Signal Received Power (RSRP)) and/or the received quality (for example, Reference Signal Received Quality (RSRQ)) of uplink reference signals. The measurement results may be output to the control section 301.

(User Terminal)

Figure 11:
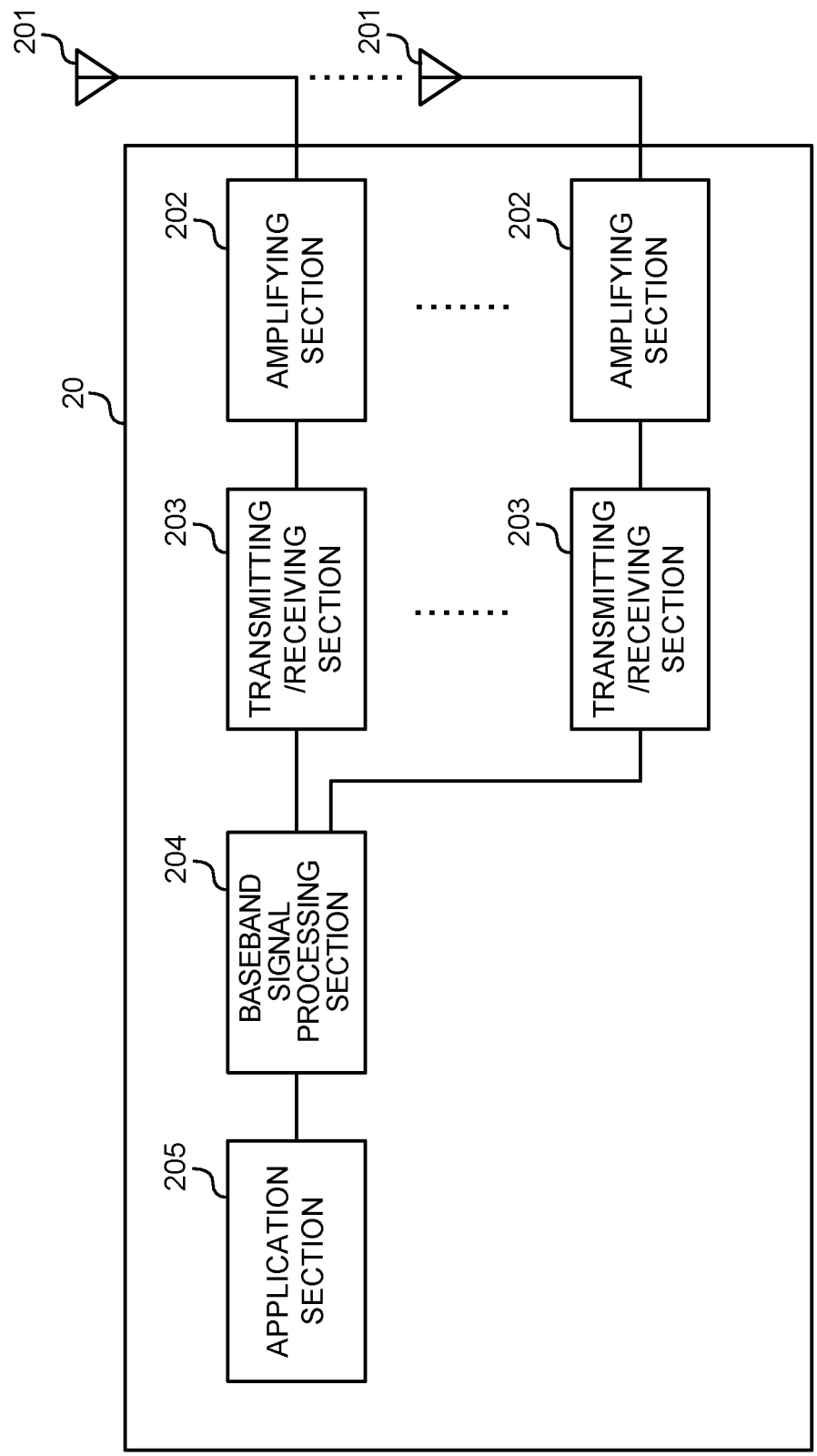
FIG. 11 is a diagram to show an example of an overall structure of a user terminal according to the present embodiment.

FIG. 11 is a diagram to show an example of an overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205.

Radio frequency signals that are received in a plurality of transmitting/receiving antennas 201 are each amplified in the amplifying sections 202. Each transmitting/receiving section 203 receives the downlink signals amplified in the amplifying sections 202. The received signals are subjected to frequency conversion and converted into the baseband signal in the transmitting/receiving sections 203, and output to the baseband signal processing section 204.

The baseband signal processing section 204 performs receiving processes for the baseband signal that is input, including at least one of an FFT process, error correction decoding, a retransmission control receiving process and so on. The downlink data is forwarded to the application section 205. The application section 205 performs processes related to higher layers above the physical layer and the MAC layer, and so on.

Meanwhile, uplink data is input from the application section 205 to the baseband signal processing section 204. The baseband signal processing section 204 performs at least one of a retransmission control process (for example, an HARQ process), channel coding, rate matching, puncturing, a discrete Fourier transform (DFT) process, an IFFT process and so on, and the result is forwarded to each transmitting/receiving section 203. UCI (for example, at least one of A/N in response to DL signals, channel state information (CSI), scheduling request (SR) and so forth) is also subjected to channel coding, rate matching, puncturing, a DFT process, an IFFT process and so on, and forwarded to each transmitting/receiving section 203.

Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

The transmitting/receiving sections 203 transmit one or more blocks (CBs), into which uplink data is divided, and uplink control information (UCI), by using an uplink shared channel. The transmitting/receiving sections 203 may receive information about resources (REs) that are subject to puncturing and/or rate matching in each CB.

The transmitting/receiving sections 203 can be constituted by transmitters/receivers, transmitting/receiving circuits or transmitting/receiving apparatus that can be described based on general understanding of the technical field to which the present invention pertains. Furthermore, a transmitting/receiving section 203 may be structured as one transmitting/receiving section, or may be formed with a transmitting section and a receiving section.

Figure 12:
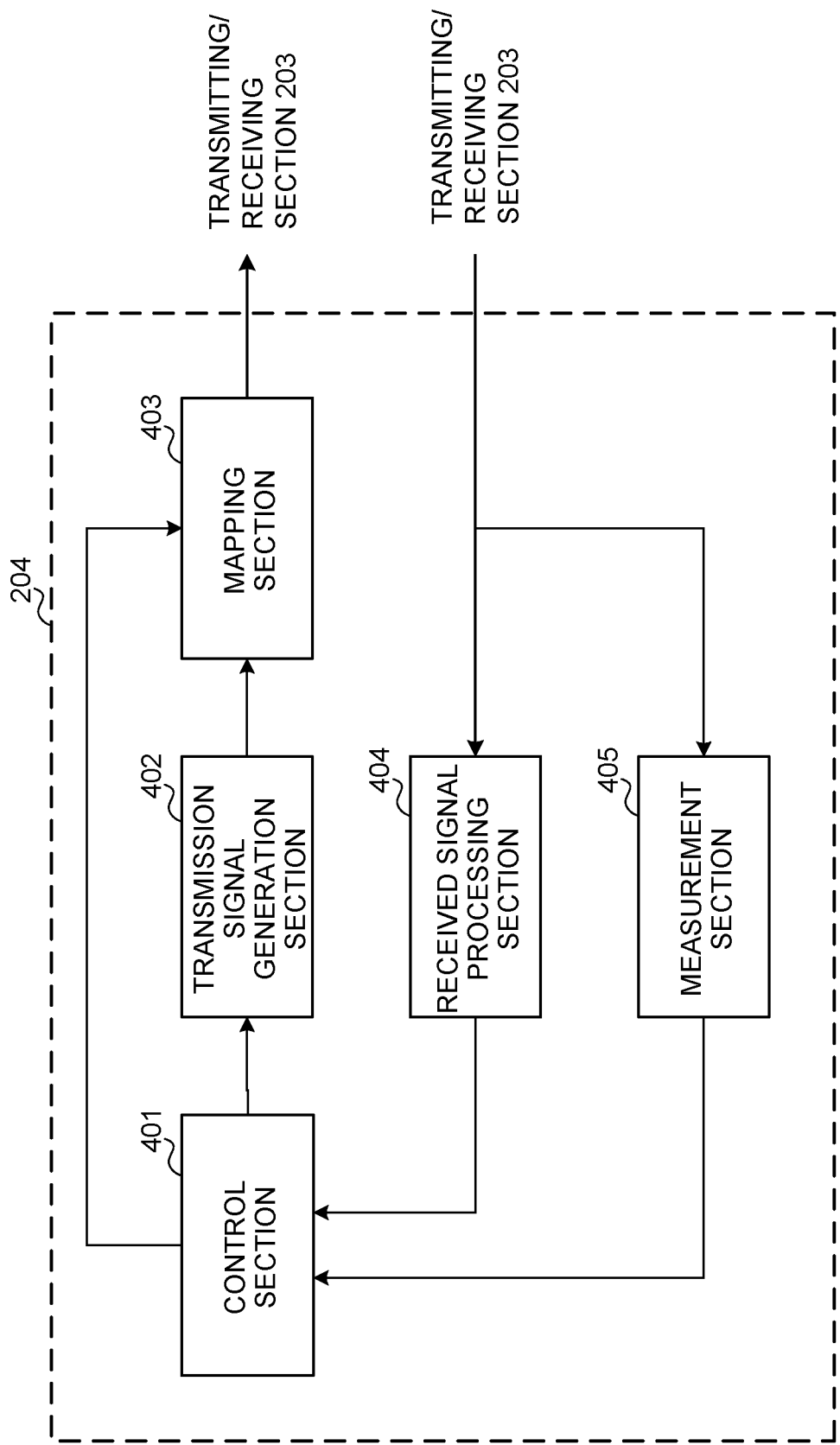
FIG. 12 is a diagram to show an example of a functional structure of a user terminal according to the present embodiment.

FIG. 12 is a diagram to show an example of a functional structure of a user terminal according to the present embodiment. Note that, although FIG. 12 primarily shows functional blocks that pertain to characteristic parts of the present embodiment, the user terminal 20 has other functional blocks that are necessary for radio communication as well. As shown in FIG. 12, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, at least one of generation of uplink signals in the transmission signal generation section 402, mapping of uplink signals in the mapping section 403, receiving processes for downlink signals in the received signal processing section 404 and measurements in the measurement section 405.

The control section 401 also controls transmission of uplink data (for example, CBs) and uplink control information (UCI) using an uplink shared channel (PUSCH).

In addition, the control section 401 may control mapping of uplink control information in symbols that are at least adjacent to demodulation reference signals for the uplink shared channel (see FIG. 4 to FIG. 7).

In addition, the control section 401 may control mapping of uplink control information to resources that are continuous and/or discontinuous in the frequency direction, in these adjacent symbols (see FIG. 4 to FIG. 7).

Also, the control section 401 may control mapping of one or more blocks (for example, CBs). To be more specific, the control section 401 may control mapping of one or more blocks, which are first mapped in the frequency direction and then mapped in the time direction (see FIG. 4 to FIG. 6), or first mapped in the time direction and then mapped in the frequency direction (FIG. 7), in the time unit and frequency resources allocated to the uplink shared channel.

Also, the control section 401 may control puncturing and/or rate matching of one or more blocks (for example, CBs) for resources (for example, REs) where UCI is mapped.

Also, the control section 401 may control mapping of demodulation reference signals for the uplink shared channel. To be more specific, the control section 401 may control mapping of the demodulation reference signal in the first symbol of the time unit allocated to the uplink shared channel (see FIG. 4 to FIG. 7).

In addition, the control section 401 may control puncturing and/or rate matching of one or more blocks (CBs), into which uplink data is divided, for resource elements where UCI is mapped.

The control section 401 can be constituted by a controller, a control circuit or control apparatus that can be described based on general understanding of the technical field to which the present invention pertains.

In the transmission signal generation section 402, uplink signals (including uplink data signals, uplink control signals, uplink reference signals, UCI, etc.) are generated (through, for example, encoding, rate matching, puncturing, modulation, and so on) as commanded by the control section 401, and output to the mapping section 403. The transmission signal generation section 402 can be constituted by a signal generator, a signal generation circuit or signal generation apparatus that can be described based on general understanding of the technical field to which the present invention pertains.

The mapping section 403 maps the uplink signals (uplink data and uplink control information) generated in the transmission signal generation section 402 to radio resources as commanded by the control section 401, and output the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding, etc.) of downlink signals (including downlink data signals, scheduling information, downlink control signals, downlink reference signals, etc.). The received signal processing section 404 outputs the information received from the radio base station 10, to the control section 401. The received signal processing section 404 outputs, for example, broadcast information, system information, high layer control information related to higher layer signaling such as RRC signaling, physical layer control information (L1/L2 control information) and so on, to the control section 401.

The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The measurement section 405 measures channel states based on reference signals (for example, CSI-RS) from the radio base station 10, and outputs the measurement results to the control section 401. Note that the channel state measurements may be conducted per CC.

The measurement section 405 can be constituted by a signal processor, a signal processing circuit or signal processing apparatus, and a measurer, a measurement circuit or measurement apparatus that can be described based on general understanding of the technical field to which the present invention pertains.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 13:
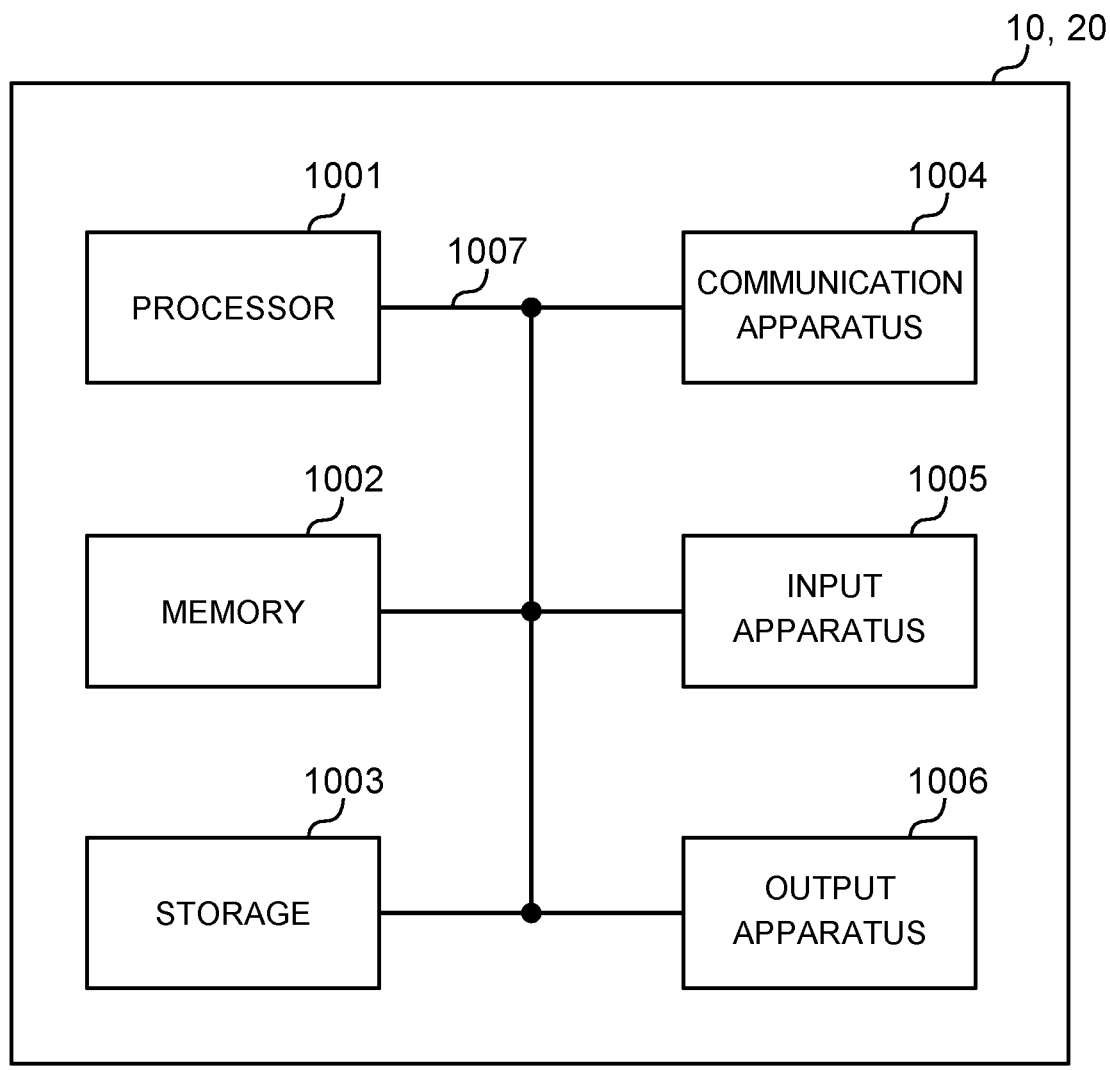
FIG. 13 is a diagram to show an example hardware structure of a radio base station and a user terminal according to the present embodiment.

That is, a radio base station, a user terminal and so on according to an embodiment of the present invention may function as a computer that executes the processes of the radio communication method of the present invention. FIG. 13 is a diagram to show an example hardware structure of a radio base station and a user terminal according to the present embodiment. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on one or more processors. Note that the processor 1001 may be implemented with one or more chips.

Each function of the radio base station 10 and the user terminal 20 is implemented by reading given software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a Read Only Memory (ROM), an Erasable Programmable ROM (EPROM), an Electrically EPROM (EEPROM), a Random Access Memory (RAM) and/or other appropriate storage media. The memory 1002 may be referred to as a "register," a "cache," a "main memory (primary storage apparatus)" and so on. The memory 1002 can store executable programs (program codes), software modules and the like for implementing the radio communication methods according to the present embodiment.

The storage 1003 is a computer-readable recording medium, and may be constituted by, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an Light Emitting Diode (LED) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an Application-Specific Integrated Circuit (ASIC), a Programmable Logic Device (PLD), an Field Programmable Gate Array (FPGA) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals" (or "signaling"). Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or multiple slots in the time domain. A subframe may be a fixed time duration (for example, 1 ms) not dependent on the numerology.

Furthermore, a slot may be comprised of one or more symbols in the time domain (Orthogonal Frequency Division Multiplexing (OFDM) symbols, Single Carrier Frequency Division Multiple Access (SC-FDMA) symbols, and so on). Also, a slot may be a time unit based on numerology. Also, a slot may include a plurality of minislots. Each minislot may be comprised of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, one subframe may be referred to as a "transmission time interval (TTI)," or a plurality of consecutive subframes may be referred to as a "TTI," or one slot or minislot may be referred to as a "TTI." That is, a subframe and/or a TTI may be a subframe (1 ms) in existing LTE, may be a shorter period than 1 ms (for example, one to thirteen symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when one slot or one minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI (TTI in LTE Rel. 8 to 12)," a "long TTI," a "normal subframe," a "long subframe," and so on. A TTI that is shorter than a normal TTI may be referred to as a "shortened TTI," a "short TTI," "a partial TTI (or a "fractional TTI")," a "shortened subframe," a "short subframe," a "minislot," "a sub-slot" and so on.

Note that a long TTI (for example, a normal TTI, a subframe, etc.) may be replaced with a TTI having a time duration exceeding 1 ms, and a short TTI (for example, a shortened TTI) may be replaced with a TTI having a TTI duration less than the TTI duration of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (Physical RB (PRB))," a "subcarrier group (SCG)," a "resource element group (REG)," a "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, minislots, symbols and so on described above are merely examples. For example, configurations pertaining to the number of subframes included in a radio frame, the number of slots per subframe or radio frame, the number of minislots included in a slot, the number of symbols and RBs included in a slot or a minislot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to given values, or may be represented using other applicable information. For example, a radio resource may be specified by a given index.

The names used for parameters and so on in this specification are in no respect limiting. For example, since various channels (Physical Uplink Control CHannel (PUCCH), Physical Downlink Control CHannel (PDCCH) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, Radio Resource Control (RRC) signaling, broadcast information (the master information block (MIB), system information blocks (SIBs) and so on), Medium Access Control (MAC) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of given information (for example, reporting of information to the effect that "X holds") does not necessarily have to be sent explicitly, and can be sent implicitly (for example, by not reporting this piece of information, by reporting another piece of information, and so on).

Decisions may be made in values represented by one bit (0 or 1), may be made in Boolean values that represent true or false, or may be made by comparing numerical values (for example, comparison against a given value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (Device-to-Device (D2D)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, Mobility Management Entities (MMEs), Serving-Gateways (S-GWs) and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-RAT (Radio Access Technology), New Radio (NR), New radio access (NX), Future generation radio access (FX), GSM (registered trademark) (Global System for Mobile communications), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access."

As used herein, when two elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

(Additional Notes)

Now, examples of configurations relating to the present disclosure will be added below. Note that the present invention is not limited to the following configurations.

[Configuration 1]

A user terminal comprising:
a transmission section that transmits uplink data, which is divided into one or more blocks, and uplink control information, by using an uplink shared channel; and
a control section that controls mapping of the uplink control information in a symbol that is at least adjacent to a demodulation reference signal for the uplink shared channel.

[Configuration 2]

The user terminal according to configuration 1, in which the control section controls mapping of the uplink control information to resources that are continuous and/or discontinuous in the frequency direction within the symbol.

[Configuration 3]

The user terminal according to configuration 2, in which the control section controls puncturing and/or rate matching of the one or more blocks in the resources.

[Configuration 4]

The user terminal according to one of configuration 1 to configuration 3, in which the control section controls mapping of the one or more blocks, which are first mapped in the frequency direction and then mapped in the time direction, or first mapped in the time direction and then mapped in the frequency direction, in a time unit and frequency resources allocated to the uplink shared channel.

[Configuration 5]

The user terminal according to one of configuration 1 to configuration 4, in which the control section controls mapping of the demodulation reference signal in the first symbol of the time unit allocated to the uplink shared channel.

[Configuration 6]

A radio communication method comprising, in a user terminal, the steps of: in a user terminal,
transmitting uplink data, which is divided into one or more blocks, and uplink control information, by using an uplink shared channel; and
controlling mapping of the uplink control information in a symbol that is at least adjacent to a demodulation reference signal for the uplink shared channel.

The disclosure of Japanese Patent Application No. 2017-208618, filed on Oct. 11, 2017, including the specification, drawings and abstract, is incorporated herein by reference in its entirety.

The invention claimed is:

1. A terminal comprising:
a processor that determines resource elements at a frequency interval for mapping uplink control information in an uplink shared channel; and
a transmitter that transmits, by using the uplink shared channel, an uplink data and the uplink control information configured by one or more coded bits,
wherein a first portion of the uplink control information including delivery acknowledgement information for a downlink shared channel is mapped in resource elements in a symbol neighboring a demodulation reference signal symbol of the uplink shared channel,
a second portion of the uplink control information including channel state information (CSI), the CSI being based on a CSI reference signal (CSI-RS), is mapped in resource elements in symbols that are not adjacent to the demodulation reference signal symbol, in the symbol neighboring the demodulation reference signal symbol, the processor maps an uplink data to resource elements other than the resource elements to which the first portion of the uplink control information including the delivery acknowledgement information for the downlink shared channel is mapped, a location where the uplink control information is mapped and whether the uplink control information is mapped to resources subject to rate matching or to resources subject to puncturing are controlled based on a type of the uplink control information, and the processor maps uplink data that is transmitted on the uplink shared channel and that is different from the uplink control information in a frequency direction first, and thereafter maps the uplink data in a time direction.

2. A radio communication method for a terminal comprising:

determining resource elements at a frequency interval for mapping uplink control information in an uplink shared channel, wherein, in a symbol neighboring a demodulation reference signal symbol of the uplink shared channel, mapping an uplink data to resource elements other than resource elements to which a first portion of the uplink control information including delivery acknowledgement information for a downlink shared channel is mapped;

transmitting, by using the uplink shared channel, an uplink data and the uplink control information configured by one or more coded bits, wherein the first portion of the uplink control information including the delivery acknowledgement information for the downlink shared channel is mapped in resource elements in the symbol neighboring the demodulation reference signal symbol of the uplink shared channel, a second portion of the uplink control information including channel state information (CSI), the CSI being based on a CSI reference signal (CSI-RS), is mapped in resource elements in symbols that are not adjacent to the demodulation reference signal symbol, and a location where the uplink control information is mapped and whether the uplink control information is mapped to resources subject to rate matching or to resources subject to puncturing are controlled based on a type of the uplink control information; and mapping uplink data that is transmitted on the uplink shared channel and that is different from the uplink control information in a frequency direction first, and thereafter mapping the uplink data in a time direction.

3. A base station comprising:

a processor that controls to receive uplink control information mapped to resource elements at a frequency interval in an uplink shared channel; and a receiver that receives, by using the uplink shared channel, an uplink data and the uplink control information configured by one or more coded bits, wherein a first portion of the uplink control information including delivery acknowledgement information for a downlink shared channel is mapped in resource elements in a symbol neighboring a demodulation reference signal symbol of the uplink shared channel, a second portion of the uplink control information including channel state information (CSI), the CSI being based on a CSI reference signal (CSI-RS), is mapped in resource elements in symbols that are not adjacent to the demodulation reference signal symbol, in the symbol neighboring the demodulation reference signal symbol, the processor controls to receive an uplink data mapped to resource elements other than the resource elements to which the first portion of the uplink control information including the delivery acknowledgement information for the downlink shared channel is mapped, a location where the uplink control information is mapped and whether the uplink control information is mapped to resources subject to rate matching or to resources subject to puncturing are controlled based on a type of the uplink control information, and uplink data that is received on the uplink shared channel and that is different from the uplink control information is mapped in a frequency direction first, and thereafter is mapped in a time direction.

4. A system comprising a terminal and a base station, wherein:

the terminal comprises:

a processor of the terminal that determines resource elements at a frequency interval for mapping uplink control information in an uplink shared channel; and a transmitter that transmits, by using the uplink shared channel, an uplink data and the uplink control information configured by one or more coded bits, wherein, in a symbol neighboring a demodulation reference signal symbol of the uplink shared channel, the processor of the terminal maps an uplink data to resource elements other than resource elements to which a first portion of the uplink control information including delivery acknowledgement information for a downlink shared channel is mapped, and the processor of the terminal maps uplink data that is transmitted on the uplink shared channel and that is different from the uplink control information in a frequency direction first, and thereafter maps the uplink data in a time direction; and the base station comprises:

a processor of the base station that controls to receive the uplink control information; and a receiver that receives, by using the uplink shared channel, the uplink data and the uplink control information configured by the one or more coded bits, wherein, in the symbol neighboring the demodulation reference signal symbol, the processor of the base station controls to receive the uplink data mapped to the resource elements, and wherein the first portion of the uplink control information including the delivery acknowledgement information for the downlink shared channel is mapped in resource elements in the symbol neighboring the demodulation reference signal symbol of the uplink shared channel, a second portion of the uplink control information including channel state information (CSI), the CSI being based on a CSI reference signal (CSI-RS), is mapped in resource elements in symbols that are not adjacent to the demodulation reference signal symbol, and a location where the uplink control information is mapped and whether the uplink control information is mapped to resources subject to rate matching or to resources subject to puncturing are controlled based on a type of the uplink control information.

* * * * *